B. G. ERLER.
RESILIENT TIRE.
APPLICATION FILED NOV. 15, 1920.
1,390,895. Patented Sept. 13, 1921.
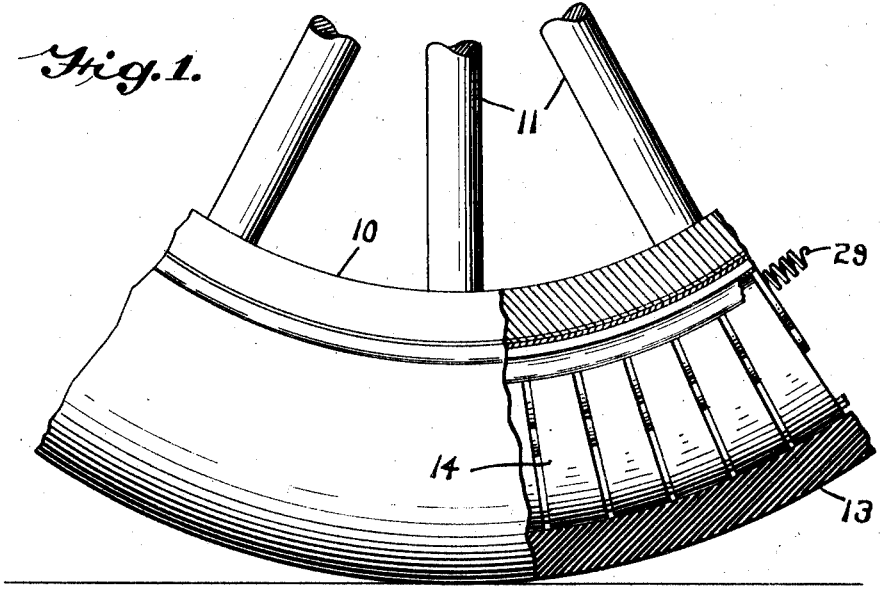
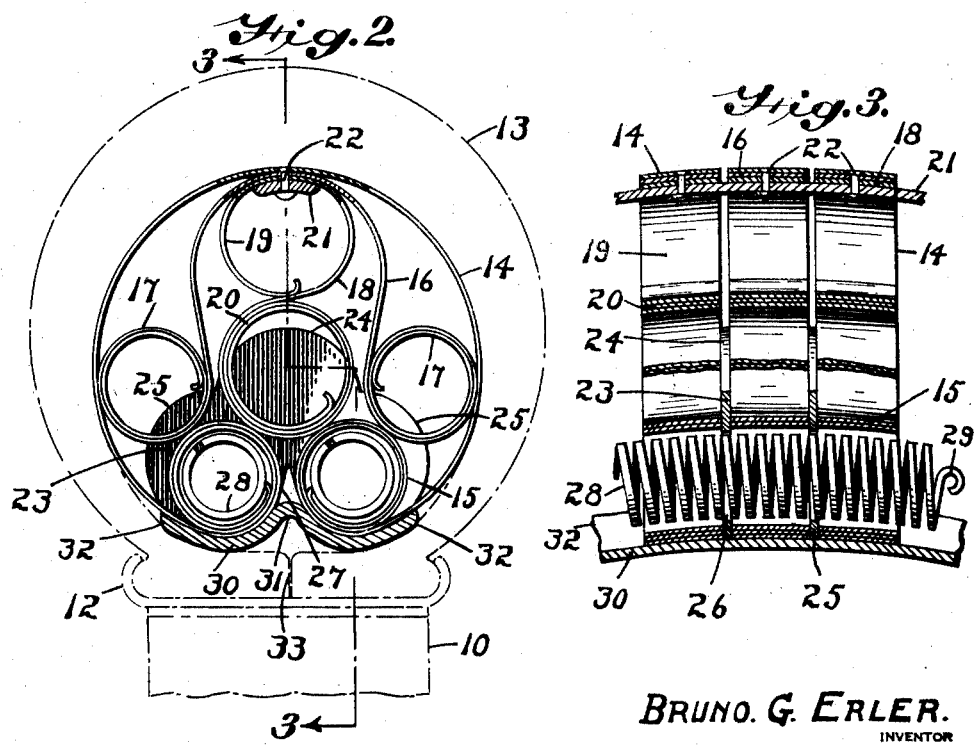
BRUNO. G. ERLER.
INVENTOR

UNITED STATES PATENT OFFICE.

BRUNO G. ERLER, OF OAK LANE, PENNSYLVANIA, ASSIGNOR OF TWO-FIFTHS TO TAYLOR J. DAVIDSON, OF CAMDEN, NEW JERSEY, AND THREE-TWENTIETHS TO JULIUS RICHTER, OF PHILADELPHIA, PENNSYLVANIA.

RESILIENT TIRE.

1,390,895.  Specification of Letters Patent.  Patented Sept. 13, 1921.

Application filed November 15, 1920. Serial No. 424,241.

*To all whom it may concern:*

Be it known that I, BRUNO G. ERLER, a citizen of the United States, residing at Oak Lane, in the county of Philadelphia and State of Pennsylvania, have invented new and useful Improvements in Resilient Tires, of which the following is a specification.

This invention relates to resilient tires and it has more particular reference to that form or pattern of tire in which a resilient means is interposed between the rim and outer cover or tread and serving as a substitute for the ordinary pneumatic tire.

The main object of this invention is to provide a tire of the type referred to which has approximately the same resiliency as a pneumatic tire but which is, due to its peculiar structure, devoid of the objectional features resulting from punctures, bursts and the like.

Another object of this invention is to provide what may be conveniently termed a resilient inner structure for tires.

A further object of this invention is to provide a tire which will be entirely free from the disadvantages resulting from punctures, blow-outs and similar troublesome contingencies incident to the ordinary type of pneumatic tire.

With the foregoing and other objects in view as will later on be more apparent as this description proceeds, the invention consists essentially of an inner structure for tires of the type referred to above, which is made entirely of more or less springy material, the various parts whereby are so assembled and flexed as to insure the proper distention of the outer covering or tread in all directions.

In the further disclosure of the invention, reference is to be had to the accompanying sheet of drawings constituting a part of this specification and in which like characters of reference designate the same or similar parts in all the views.

Figure 1— is a fragmentary side view, partially broken away or in section, of a tire and the wheel rim therefor, as constructed in accordance with the hereinafter described invention.

Fig. 2— is a transverse section of the same, drawn to an enlarged scale, the dot and dash lines indicating the outer covering or tread, as well as a fragmentary portion of the wheel rim and felly; and Fig. 3— is a section taken approximately on the line 3—3 in Fig. 2, and looking in the direction of the arrows thereon.

Referring more particularly to the views, the numeral 10 designates a part of the automobile wheel felly, 11 the spokes, 12 the demountable rim and 13 the outer cover or tire proper, all of said parts being constructed and arranged in accordance with the well known method of manufacture and being so designated for purposes of ease in description, and it is also desired to here point out that said parts constitute and form no part of the present invention.

The improved inner tube substitute or resilient insert constituting the feature of the present invention comprises a series of radially disposed arched or C shaped flat thin steel springs 14, the inner ends whereof are turned over or spirally wound to constitute substantially closed eye pieces 15, and disposed within each of the aforesaid steel springs 14, is a second inverted U-shaped spring 16, the ends whereof are coiled to constitute eye pieces 17, and it is to be here particularly noted that this spring 16 functions in use laterally of the tire and furthermore that it is made of appropriate size and proportions so that when the parts are assembled as shown and as will be more clearly understood on an examination of Fig. 2 for the eye pieces 17 to normally rest or have what may be termed a rolling contact on the eye pieces 15 and the adjoining inner face of the flat thin steel springs 14. Radially pendent or disposed in each of the aforesaid U-shaped springs 16 is an S-shaped spring 18, the outer convolution 19 whereof abuts the outer end of said spring 16 and the inner convolution or coiled end 20 whereof seats on the aforesaid eye pieces 15. It is also to be here carefully noted that the size and proportion of this spring 18 is such that when the parts are assembled and not stressed or compressed, they will assume or occupy the position illustrated in Fig. 2.

In order to provide a means for maintaining the aforesaid springs 14, 16 and 18 in properly disposed relation I preferably employ an inner annular ring 21 of segmental cross section and attach thereto each set of said springs 14, 16 and 18 by means of a rivet or the like 22.

Positioned between the ends of each two adjacent sets of springs 14, 16 and 18 is a spacing element or washer 23 of the pattern clearly shown in Fig. 2, that is to say, of clover leaf configuration and it includes an outer curved part 24, lateral wing portions 25 having holes 26 therethrough of a diameter equal to the inner diameter of the eyes 15 and a bifurcated or wedge shaped cut out portion 27 for the purpose hereafter explained.

Threaded through the registering holes in the eyes 15 and the holes 26 in the spacing elements or washers 23 are continuous contractile springs 28, the ends whereof are hooked at 29 and when the parts are assembled as shown, said ends 29 are drawn together and brought into hooked engagement or connection by any appropriate means and it will thus be readily seen that these contractile springs 28 serve as a locking means for maintaining the inner ends of the radially disposed flat springs 14 in proper relation as well as insuring an even distribution of the requisite resiliency all around the complete tire insert.

In order to provide a seating or locking means for the inner tube substitute construction above set forth, I preferably employ an inner annular ring 30 which is formed with a central outwardly projecting peripheral bead or projection 31 which when the parts are brought together, sits in the aforementioned bifurcation or cut out portion 27 of the spacing elements or washers 23 as well as between the eye pieces 15. For ordinary pneumatic tire casings this annular ring 30 is fashioned with lateral and outwardly curved flared flanges 32 on each side of the central bead 31 so that said ring seats more snugly on the inner beaded edges of the outer cover 13 and it is to be here noted that in connection with the outer cover 13 I preferably form inner beaded edges so that when the parts are brought together at 33 a firm bed or seat for the ring 30 will be provided. I have found this formation of the inner beaded edges of importance in that when the tire is in use an effective means is provided for preventing the outer cover from rolling upward or outward or in other words by the formation of the inner beaded edges as set forth the outer cover is more effectively locked in position relative to the demountable rim 12 and the inner ring 30.

From the foregoing description it will be readily seen that the ring 21 and arched or outer spring 14 as well as the inner inverted U-shaped springs 16, are supported in expanded relation by means of the inner S-shaped springs 18 while the eyed portions 15, 17 and 20 provide what may be termed for rolling contact between the several spring elements constituting my improved resilient tire or tire insert. On the other hand the contractile springs 28 and spacing elements or washers 23 make provision for the necessary bending of the springs 14 when the tire is compressed at the point of impact with the surface over which it has traveled.

Furthermore by the particular manner and method of arranging the several parts constituting the improved resilient tire above described considerable latitude is provided for in the flexure of the springs 14 and to accommodate the flexure of the outer casing or covering 13 when subjected to varying loads or successive shocks. Still further it is to be observed that by the employment of the outer and inner annular rings 21, 30, of suitable width, provision is made for preventing the abrading, chafing or otherwise injuring the inner surface of the tire casing or cover 13 due to creeping and the like.

Finally it will be readily seen that a tire provided with an inner structure or insert of the character above described and made entirely of spring steel or other suitable metal and assembled as set forth, can be easily and expeditiously set in place, and while I have described the most practical embodiment of my invention at present known to me, I wish it clearly understood that various changes may be made in the shape and disposition of the various parts as well as other arrangements and combinations effected without in any way departing from the spirit and scope of said invention as more specifically defined by the appended claims.

Having described my invention what I claim as new and desire to secure by Letters Patent is:—

1. In a resilient tire the combination with an outer covering, of an inner supporting structure including an annular band, inwardly and radially projecting arched springs, inwardly and radially projecting inverted U-shaped springs and inwardly and radially projecting S-shaped springs carried by said annular band, means flexibly connecting the inner ends of the arched springs, and an inner annular ring for maintaining the inner ends of the arched springs in spaced relation.

2. In a resilient tire the combination with an outer covering, of an inner supporting structure including an annular band, inwardly and radially projecting arched flat springs having eyed ends, inwardly and radially projecting inverted U-shaped flat springs having eyed ends and inwardly and radially projecting S-shaped flat springs having eyed ends carried by said annular band, the eyed ends of the arched, U-shaped and S-shaped springs having rolling contact, means flexibly connecting the inner ends of the arched springs, and an inner annular ring for maintaining the inner ends of the arched springs in spaced relation.

3. In a resilient tire the combination with an outer covering, of an inner supporting structure including an annular band, concavo-convex in cross section, inwardly and radially projecting arched flat springs having eyed ends, inwardly and radially projecting inverted U-shaped flat springs having eyed ends, and inwardly and radially projecting S-shaped flat springs having eyed ends carried by said annular band, the eyed ends of said springs all having a rolling contact when assembled, contractile means threaded through the eyed ends of the arched flat springs, and an inner annular ring for maintaining the inner ends of the arched springs in spaced relation.

4. A resilient insert for vehicle tires comprising a supporting structure including an annular band, inwardly and radially projecting arched flat springs having eyed ends, inwardly and radially projecting inverted U-shaped flat springs and inwardly and radially projecting S-shaped flat springs carried by said annular band, the inner ends of the arched, U-shaped and S-shaped springs having a rolling contact, apertured spacing elements having a cut-out portion on their inner edges disposed between the inner ends of said springs, contractile springs threaded continuously through the eyed ends of the arched springs and the apertures of the spacing elements, and an inner annular centrally beaded ring for maintaining the inner ends of the arched springs in spaced relation.

In testimony whereof I affix my signature.

BRUNO G. ERLER.